Patented Dec. 24, 1940

2,226,183

UNITED STATES PATENT OFFICE 2,226,183

MOLD INHIBITOR FOR PHOTOGRAPHIC ELEMENTS

Cyril J. Staud and Catherine Salo Popper, Rochester, N. Y., assignors to Eastman Kodak Company, Rochester, N. Y., a corporation of New Jersey No Drawing. Application December 27, 1939, Serial No. 311,196

9 Claims. (Cl. 95—7)

This invention relates to antiseptics for photographic gelatins and emulsions, and to a method for preventing bacterial growth in such gelatins and emulsions.

Heretofore, a number of mold growth inhibitors have been employed in photographic gelatins and emulsions to prevent the gelatin, the emulsion and the product, a photographic film, from being attacked by bacterial action. Such inhibitors as formaldehyde, phenol, thymol, and the esters of p-hydroxybenzoic acid, known as parasepts, such as methyl, ethyl, propyl, butyl, and benzyl parasept, mucochloric and mucobromic acids have been previously employed for these purposes in the prior art.

While these inhibitors for the most part are satisfactory, we have discovered another class of antiseptic compounds some of which have proved to be superior to those listed above in inhibiting bacterial growth on such photographic materials.

We have found that the class of compounds which may be termed the pseudo esters of halogen substituted aldehyde acids are excellent inhibitors. In particular we have found that the pseudo methyl and ethyl esters of mucochloric acid have greater mold inhibiting properties at low concentrations then do the above listed antiseptics. Other compounds of this type which are satisfactory as inhibiting agents are: pseudo butyl ester of mucochloric acid, psuedo methyl ester of mucobromic acid, pseudo ethyl ester of mucobromic acid, and pseudo n-butyl ester of mucobromic acid.

These compounds may be produced according to the procedure of Simonis, Berichte der Deutschen Chemischen Gesellschaft, vol. 34 (1901), page 509.

The general type of reaction is shown structurally as follows:

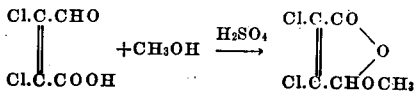
Mucochloric acid

Pseudo methyl ester of mucochloric acid

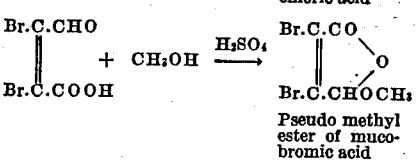

Pseudo methyl ester of mucobromic acid

To form the other above mentioned ethyl and butyl pseudo esters, the corresponding alcohols are employed in the reaction in place of methyl alcohol.

These pseudo esters are soluble in ethyl alcohol and can be added to and incorporated in the gelatin when it is in a water solution as described in the following examples:

Example I

To 1000 parts of a 10% gelatin solution adjusted to a pH of 7.5 is added 0.10 gram of pseudo methyl ester of mucochloric acid dissolved in 5 parts of ethyl alcohol. The solution is stirred to distribute the inhibitor therethrough and the gelatin is then protected against mold growth.

Example II

To 1000 parts of 10% gelatin solution having a pH of 7.5 is added 0.10 gram of pseudo ethyl ester of mucochloric acid dissolved in 5 parts of ethyl alcohol. The solution is stirred to distribute the inhibitor therethrough. As shown in the following tabulations the above mentioned methyl and ethyl esters are particularly effective at this concentration in preventing bacteria growth.

Example III 1000 parts of 10% gelatin solution having a pH of 7.5 are mixed with 0.40 gram of pseudo methyl ester of mucobromic acid dissolved in 5 parts of ethyl alcohol. As shown in the following table, this ester is an effective mold inhibitor at this concentration.

Example IV 1000 parts of 10% gelatin solution having a pH of 7.5 are mixed with 0.40 gram of pseudo n-butyl ester of mucobromic acid in ethyl alcohol. At this concentration of ester no mold growth will occur.

Example V 1000 parts of 10% gelatin solution having a pH of 7.5 are mixed with 0.80 gram of pseudo ethyl ester of mucobromic acid in ethyl alcohol. Mold growth in the gelatin is prevented at this concentration.

Example VI

We have employed these pseudo esters successfully in emulsions. To about 5 cc. of ethyl alcohol there was added 0.10 gram of pseudo methyl ester of mucochloric acid to form a solution of the ester in the alcohol. This solution was added to 225 grams of a high speed, high contrast photographic emulsion (containing about 7% gelatin), and after mixing the solution of the inhibitor with the emulsion the emulsion was coated on a transparent cellulose acetate support. A similar emulsion to which no inhibiting agent had been added was coated on a similar support, and the two emulsions were tested for bacteria formation. No mold growth occurred on the emulsion layer containing the inhibitor but some spotting due to mold formation was noted on the emulsion which did not contain an antiseptic.

One method of determining the efficacy of the pseudo esters of the halogen substituted aldehyde acids is as follows: To each of 6 test tubes were added the 10% gelatin solution adjusted to a pH of 7.5 containing the inhibitor to be tested in such proportion to give the following series of concentrations per liter of gelatin solution 0 (plain gelatin solution of a pH of 7.5 having no inhibitor), 0.05, 0.10, 0.20, 0.40, and 0.80 grams of the inhibitor per liter of gelatin.

These solutions are compared with gelatin solutions containing varying proportions of phenol and thymol. 0.2 gram of phenol and 0.02 gram of thymol were added to 100 cc. of the gelatin solution. The concentrations were adjusted to the following ratios: 0.125 g. phenol/0.0125 g. thymol; 0.25 g. phenol/0.025 g. thymol; 0.5 g. phenol/0.05 g. thymol; 1 g. phenol/0.1 g. thymol and 2 g. phenol/0.2 g. thymol.

*Comparative table*

| Phenol-thymol mixture | Concentrations (grams per liter) | | | | | |
|---|---|---|---|---|---|---|
| | 0=plain gelatin | .125/.0125 | .25/.025 | .5/.05 | 1g./.1 | 2g./.2 |
| | +1 | +1 | v. sl.+ | v. sl.+ | — | — |
| Addenda | 0=plain gelatin | .05 | .10 | .20 | .40 | .80 |
| Methyl parasept | +1. | +1. | +1. | +1. | +1. | — |
| Ethyl parasept | +1. | +1. | +1. | +1. | sl.+ | — |
| Propyl parasept | +1. | +1. | + | v. sl.+ | — | — |
| Butyl parasept | +1. | + | sl.+ | sl.+ | — | — |
| Benzyl parasept | +1. | +1. | sl. cryst.+ | sl. cryst.— | cryst.+ | cryst.+ |
| Mucochloric acid | +1. | +1. | v. sl.+ | — | — | — |
| Pseudo methyl ester of mucochloric acid | +1. | sl.+ | — | — | — | — |
| Pseudo ethyl ester of mucochloric acid | +1. | sl.+ | — | — | — | — |
| Pseudo butyl ester of mucochloric acid | +1. | + | + | sl.+ | — | — |
| Mucobromic acid | +1. | +1. | sl.+ | — | — | — |
| Pseudo methyl ester of mucobromic acid | +1. | +1. | +1. | + | — | — |
| Pseudo ethyl ester of mucobromic acid | +1. | +1. | +1. | + | sl.+ | — |
| Pseudo n-butyl ester of mucobromic acid | +1. | + | + | sl.+ | — | — |
| Formaldehyde | +1. | + | + | + | — | — |

+1.=liquefaction and bacterial growth.
sl.+=slight growth of bacteria.
v. sl.+=very slight growth of bacteria.
—=no growth of bacteria.

It will be noted that in the case of methyl and ethyl mucochloric acids, the effective concentrations to prevent bacterial growth are one-half that required when mucochloric acid is used. These compounds represent an increase in effectiveness of from four to eight times that obtained with the esters of p-hydroxybenzoic acid, known as parasepts, and are more effective than formaldehyde, or mixtures of phenol and thymol, as shown in this table.

The amount of inhibitor employed in accordance with our invention may vary from about 0.10 to 0.80 gram to 1000 cc. of gelatin solution.

What we claim is:

1. A photographic element containing gelatin and having as a bacteria inhibiting agent a pseudo ester of a halogen substituted aldehyde acid incorporated therein.

2. A photographic element comprising a photographic emulsion layer containing as a bacteria inhibiting agent a pseudo ester of a halogen substituted aldehyde acid incorporated therein.

3. A photographic element containing gelatin and having as a bacteria inhibiting agent pseudo methyl ester of mucochloric acid incorporated therein.

4. A photographic element containing a gelatin and having as a bacteria inhibiting agent pseudo ethyl ester of mucochloric acid incorporated therein.

5. The method of preventing bacteria growth in gelatin which comprises incorporating therein a pseudo ester of a halogen substituted aldehyde acid.

6. The method of preventing bacteria growth in a photographic gelatin which comprises incorporating therein a pseudo ester of mucochloric acid.

7. The method of preventing bacteria growth in a photographic element containing gelatin which comprises incorporating therein a pseudo ester of mucobromic acid.

8. The method of preventing bacteria growth in a photographic element containing gelatin which comprises incorporating therein a pseudo methyl ester of mucochloric acid.

9. The method of preventing bacteria growth in a photographic element containing gelatin which comprises incorporating therein a pseudo ethyl ester of mucochloric acid.

CYRIL J. STAUD.
CATHERINE SALO POPPER.